April 17, 1951     L. L. JOSEPH     2,549,098

MEASURING TAPE

Filed April 30, 1947

INVENTOR
LOUIS L. JOSEPH

By, Joshua R. H. Potts

HIS ATTORNEY

Patented Apr. 17, 1951

2,549,098

UNITED STATES PATENT OFFICE 2,549,098

MEASURING TAPE

Louis L. Joseph, Chicago, Ill.

Application April 30, 1947, Serial No. 744,853

6 Claims. (Cl. 242—84.9)

The present invention relates to improvements in retractile measuring tapes.

In the type of measuring tape wound in a spiral within a casing, it has been proposed to prevent the automatic retraction of the tape by ratchet release means or the like. In drawing out such tapes for use, the tape cannot be held at any desired point, but can only be held at a point which coincides with the ratchet holding means. Furthermore, such ratchet devices are relatively expensive and increase the cost of manufacture of such tapes. In particular, in the advertising novelty field where cost of manufacture must be maintained low, the cost of such devices may prohibit their use in this field.

It is an object of the present invention to provide a freely retractile tape which may be employed with a stop to hold the tape in any desired extended position.

Another object is the provision of a retractile tape which may be automatically retracted, or which may be held in any extended position, as desired.

Another object is to provide a retractile tape which may be drawn from its case and held in exactly the desired position.

Another object is the provision of a retractile tape having a friction brake or drag for holding the tape in any desired position.

A further object is the provision of a friction brake or drag for a spirally wound tape which acts directly upon the tape itself to hold the tape in any desired position.

Still another object is the provision of a friction brake for a retractile tape which is of simple construction and is inexpensive to manufacture.

In accordance with the present invention, I provide a retractile tape having a friction drag or brake member which may be extended to frictionally clamp the tape between the brake member and the housing, and in this position the tape may be held by the drag, or may be extended as desired by the user, the drag merely resisting the retracting force of the spring. Or if desired, the friction brake member may be retracted so that the tape may be drawn out to the desired extent and then held in extended position by application of the friction brake.

Further objects and advantages will appear and be brought out more fully in the following specification, reference being had to the accompanying drawings, in which.

Figure 1:
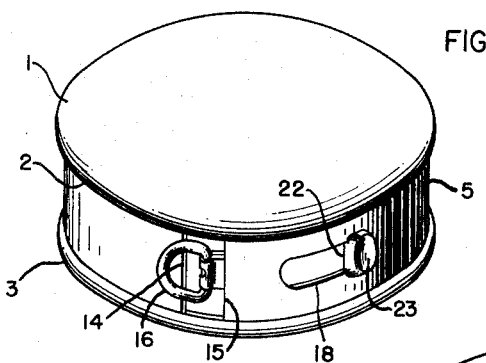
Fig. 1 is a perspective view of one form of tape casing having my invention applied thereto.
Figure 2:
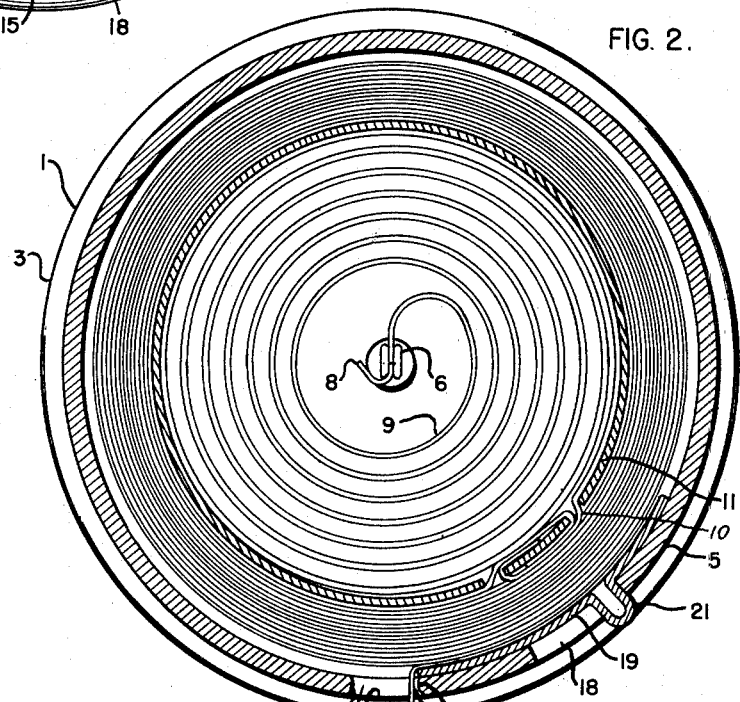
Fig. 2 is a horizontal median section of Fig. 1, the tape and spring being shown in plan.

Referring to the drawing, there is shown a casing 1 comprising a reinforced top 2 and bottom 3 each having a groove 4 therein in which is coiled a strip 5 of flexible material providing a generally cylindrical wall for the housing. The top and bottom of the casing may be formed of any suitable material such as sheet metal, "Celluloid," or metal reinforced plastic material, and the wall 5 may be made of similar material. Within the housing is a fixed divided stud 6 or the like which anchors one end 8 of a spiral spring 9, the other end 10 of the spring being suitably secured to a drum 11 to which is also secured one end of a flexible tape 12, of cloth or other material, in any suitable manner. The tape 12 extends through an opening 13 provided in wall 5 between the ends 14 and 15 thereof and has a finger loop 16 of wire or the like, which is larger than the opening and, therefore, prevents the tape from being retracted entirely within the casing by the tension of spring 9.

Figure 4:
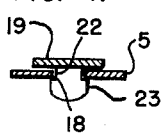
Fig. 4 is a section taken on line IV—IV of Fig. 3.

The wall 5 has an opening 18 and a curved slidable strip brake 19 has a boss 21 preferably formed integrally therewith from the strip material, said lobe having a laterally reduced neck portion 22, (Figs. 1 and 4) thus providing a head 23 of longer vertical dimension (as seen in Fig. 1) than the width of opening 18. The lobe 21 preferably is formed intermediate the ends 22 and 23 of the brake so as to provide guiding band portions at each end. The head 23 may be inserted through the opening 18 before assemblying the band 5 to the top and bottom of the casing, by turning the band at a right angle to the position shown and forcing the narrow portion of the head through the slot then turning the band to operative position as shown.

Figure 3:
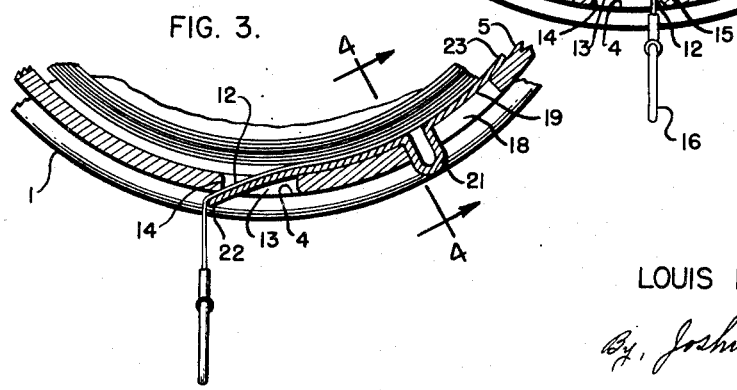
Fig. 3 is an enlarged view of a portion of Fig. 2 showing the invention in operative position.

The operation of the invention now will be described. When the lobe 21 is moved circumferentially in the slot toward the slot 13, the tape 12 guides the end or tongue 22 through the opening 13 over the edge 14, as seen in Fig. 3, although the friction of the outgoing tape is sufficient to bring the tongue to this position if desired. The band 19 is sufficiently flexible to bend or deform to allow the end 22 to extend through the opening, as shown in Fig. 3, and the resiliency of the deformed band clamps the tape between it and the edge 14 firmly enough to prevent the spring from winding up the tape, while allowing the tape to be withdrawn or extended as desired. Also the flexing of the tongue 22 causes the underside of head 23 to frictionally engage the strip 5 so as to assist in holding the tongue against retraction by the action of the spring on the tape. This holding action also may be assisted by the engagement of the tongue 22 with the edge 15 of the strip 5. Thus the tape can be held by the friction band in any extended position. Ordinarily in use the tape will be first pulled out to the desired length, and then the brake band 19 will be moved by operating knob 23 into position to grip the tape against retraction by the spring 9. However, if desired, the brake band can be first shifted to gripping position, and then the tape is pulled out to the desired length against the force of spring 9 and the frictional resistance of the brake. Thus the tape may always be held in any desired extended position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. The combination of a retractile tape housing embodying a cylindrical wall having a slot through which tape may be extended with a flexible tape coiled within said housing and extending through said slot, and a tape brake disposed between said coil and wall, parallel to said wall, said brake being slidable and deformable through said opening to tape braking position overlapping an outer edge portion of said slot, and being also slidable to slot closing position, as desired.

2. In combination, a retractile tape housing, embodying a substantially cylindrical wall having a tape passing slot, a flexible tape coiled within said wall and extending through said slot, means for maintaining a portion of said tape in said slot at all times and a slidably operatable flexible tape brake having a curvature corresponding to that of said wall when idle, said brake being automatically deflected and slidable from idle positions, through said slot by the friction of said tape when passing outwardly therethrough to a position of braking said tape against an edge of said slot, said brake being likewise retractable with the return movement of said tape.

3. The combination of a retractile tape housing embodying a cylindrical wall with a tape emitting slot, with a flexible measuring tape coiled within said wall and extending through said slot, and a tape brake having a curvature corresponding to that of said wall and slidably operated by the friction of tape passing through said slot, said brake including a means by which said brake may be manually assisted when thus operated or be manually held against such operation, or by which said slot may be manually closed, as desired.

4. A retractile tape housing embodying two substantially round parallel side walls and a cylindrical wall having a slot through which tape may be extended and an opening spaced from said slot, said opening having two edges parallel to said sidewalls, a flexible tape coiled within said housing and extending through said slot, and a slidably operating tape brake having a curvature corresponding to that of said walls and adapted to be simultaneously slid and sprung through said slot in breaking said tape against an edge of said slot, said brake having a lobe with smooth and unbroken fore and aft thumb and finger contacting surfaces, said lobe extending through said opening and laterally overhanging said two edges of same, so that when said brake is extended through said slot the overhanging portions of said lobe frictionally engage said opening, said brake being otherwise entirely within said housing when idle.

5. A retractile tape housing embodying two substantially round parallel side walls and a cylindrical wall having a slot through which tape may be passed and having an opening spaced from said slot, said opening having two edges parallel to said side walls between which thumb or finger contact can be made, a flexible tape coiled within said housing and extending through said slot a tape brake having a curvature corresponding to that of said walls and slidably related to the interior surface of said cylindrical wall, said brake having an operating lobe extending through said opening by which said brake is slid by thumb or finger contact against said lobe and against said brake between said edges, said brake having a tongue conveniently slidable and springable through said slot by frictional contact of tape passing out of said housing through said slot.

6. In combination, a retractile tape housing embodying a cylindrical peripheral wall with a slot through which a tape may be extended and an opening near said slot, a flexible measuring tape coiled within said housing and extending through said slot, a combined slot closing and brake slide disposed between said tape and the inner surface of said wall consisting of a flexible brake having a slot closing section and another section spaced therefrom, said slide including a flexible U-bend connecting said sections and extending through said opening for manual manipulation of said slide, said slide being adapted to automatically follow said tape outwardly, the free end of said slot closing section springing outwardly to the position of braking said tape inwardly against an outer edge region of said slot.

LOUIS L. JOSEPH.

REFERENCES CITED

The following references are of record in the file of this patent:

UNITED STATES PATENTS

| Number | Name | Date |
|---|---|---|
| 690,897 | Sims | Jan. 7, 1902 |
| 694,329 | Smeeton | Feb. 25, 1902 |
| 1,800,911 | Smith | Apr. 14, 1931 |
| 2,016,483 | Carlson | Oct. 8, 1935 |
| 2,132,202 | Carlson | Oct. 4, 1938 |

FOREIGN PATENTS

| Number | Country | Date |
|---|---|---|
| 404,043 | Great Britain | Jan. 11, 1934 |